United States Patent
Cho et al.

(10) Patent No.: US 9,467,193 B2
(45) Date of Patent: Oct. 11, 2016

(54) MULTI-BAND FILTER

(71) Applicant: Innertron, Inc., Incheon (KR)

(72) Inventors: Hak-Rae Cho, Incheon (KR); Soo-Duk Seo, Incheon (KR); Moon-Bong Ko, Incheon (KR)

(73) Assignee: Innertron, Inc., Incheon (KR)

( * ) Notice: Subject to any disclaimer, the term of this patent is extended or adjusted under 35 U.S.C. 154(b) by 119 days.

(21) Appl. No.: 14/228,873

(22) Filed: Mar. 28, 2014

(65) Prior Publication Data

US 2015/0280300 A1 Oct. 1, 2015

(30) Foreign Application Priority Data

Mar. 28, 2014 (KR) .................. 10-2014-0037064

(51) Int. Cl.
| | |
|---|---|
| *H01P 1/208* | (2006.01) |
| *H04B 1/40* | (2015.01) |
| *H01Q 5/50* | (2015.01) |
| *H04W 72/04* | (2009.01) |
| *H01P 1/205* | (2006.01) |
| *H01P 1/213* | (2006.01) |
| *H01P 5/12* | (2006.01) |

(52) U.S. Cl.
CPC ............... *H04B 1/40* (2013.01); *H01P 1/2053* (2013.01); *H01P 1/2084* (2013.01); *H01P 1/2136* (2013.01); *H01P 5/12* (2013.01); *H01Q 5/50* (2015.01); *H04W 72/0453* (2013.01)

(58) Field of Classification Search
CPC ................................ H01P 1/208; H01Q 5/50
See application file for complete search history.

(56) References Cited

U.S. PATENT DOCUMENTS

2006/0229049 A1* 10/2006 Ahonpaa ............. H04B 7/022
455/272
2010/0052824 A1* 3/2010 Kim ..................... B23K 26/246
333/232

FOREIGN PATENT DOCUMENTS

| | | |
|---|---|---|
| JP | 2005-277594 A | 10/2005 |
| JP | 2006-157907 A | 6/2006 |
| KR | 2008-0056545 | 6/2008 |
| KR | 10-2008-0114104 | 12/2008 |
| KR | 10-1257599 B1 | 4/2013 |

OTHER PUBLICATIONS

Korean Office Action dated Apr. 1, 2015 received in corresponding Korean Patent Application No. 10-2014-0037064.
Notice of Allowance dated Oct. 5, 2015, received in corresponding Korean Patent Application No. 10-2014-0037064.

* cited by examiner

*Primary Examiner* — Dameon E Levi
*Assistant Examiner* — Andrea Lindgren Baltzell
(74) *Attorney, Agent, or Firm* — Knobbe Martens Olson & Bear, LLP

(57) ABSTRACT

A multi-band filter is disclosed. The multi-band filter includes: a housing including an antenna connector connected to an antenna and a plurality of input/output connectors inputting/outputting signals transmitted and received through the antenna depending on a preset frequency band; a plurality of band pass filter units provided in the housing and passing the signals in the preset frequency band therethrough between the antenna connector and the input/output connectors; and a coupling unit including a plurality of feeding parts so as to couple the antenna connector and each of the plurality of band pass filter units to each other.

10 Claims, 5 Drawing Sheets

MULTI-BAND FILTER

CROSS REFERENCE TO RELATED APPLICATION

This application claims the benefit of Korean Patent Application No. 10-2014-0037064, filed on Mar. 28, 2014, entitled "Multi-band Filter", which is hereby incorporated by reference in its entirety into this application.

BACKGROUND

1. Technical Field

The present invention relates to a multi-band filter.

2. Description of the Related Technology

In accordance with the development of a wireless communication technology, various types of wireless communication services may be used in a portable digital terminal. An example of these wireless communication services includes global system for mobile communication (GSM) using a frequency band of 890 to 960 MHz, personal communication services (PCS) using a frequency band of 1.8 GHz, world interoperability for microwave access (Wi-MAX) using a frequency band of 3.6 to 3.8 GHz, wireless local area network (WLAN) using a frequency band of 2.4 GHz or 5 GHz, wireless broadband Internet (WiBro) using a frequency band of 2.3 GHz, and Bluetooth using a frequency band of 2.4 GHz, and the like.

Recently, the portable digital terminal uses a multi-band antenna system in order to use wireless communication services provided in various frequency bands. In the multi-band antenna system, a resonator for implementing both of narrow band characteristics and excellent rejection characteristics is required. Korean Patent Laid-Open Publication No. 2008-0056545 relates to the above technology.

SUMMARY

An object of the present invention is to provide a multi-band filter including a resonator having improved attenuation characteristics and band rejection characteristics.

According to an exemplary embodiment of the present invention, there is provided a multi-band filter including: a housing including an antenna connector connected to an antenna and a plurality of input/output connectors inputting/outputting signals transmitted and received through the antenna depending on a preset frequency band; a plurality of band pass filter units provided in the housing and passing the signals in the preset frequency band therethrough between the antenna connector and the input/output connectors; and a coupling unit including a plurality of feeding parts so as to couple the antenna connector and each of the plurality of band pass filter units to each other.

The housing may include: a plurality of filtering partition walls partitioning filtering cavities disposed so as to correspond to the input/output connectors; and a plurality of coupling partition walls partitioning coupling cavities receiving the feeding parts therein.

The band pass filter unit may include: a substrate coupled to a lower surface of the housing and serving as a ground; and a resonator coupled to the substrate and including a conductive film coupled to at least one of end surfaces, in a length direction, of the body in which a penetration hole is formed in one direction and a wall surface of the penetration hole.

The body may be made of a dielectric material and may have the penetration hole formed therein in one direction.

The conductive film may be coupled to at least one of both end surfaces of the body in the length direction and the wall surface of the penetration hole.

The housing may include a first coupling disk connected to the input/output connector to transfer input/output signals to at least one of the input/output connector and the resonator and disposed so as to be spaced apart from the resonator by a preset gap.

The coupling unit may include a second coupling disk connected to the feeding part to transfer input/output signals to at least one of the feeding part and the resonator and disposed so as to be spaced apart from the resonator by a preset gap.

The coupling unit may include a conductor bar connecting the feeding parts to each other and connected to the antenna connector.

The multi-band filter may further include a cover coupled to the housing and covering an opened surface of the housing.

DETAILED DESCRIPTION OF EXEMPLARY EMBODIMENTS

Figure 1:
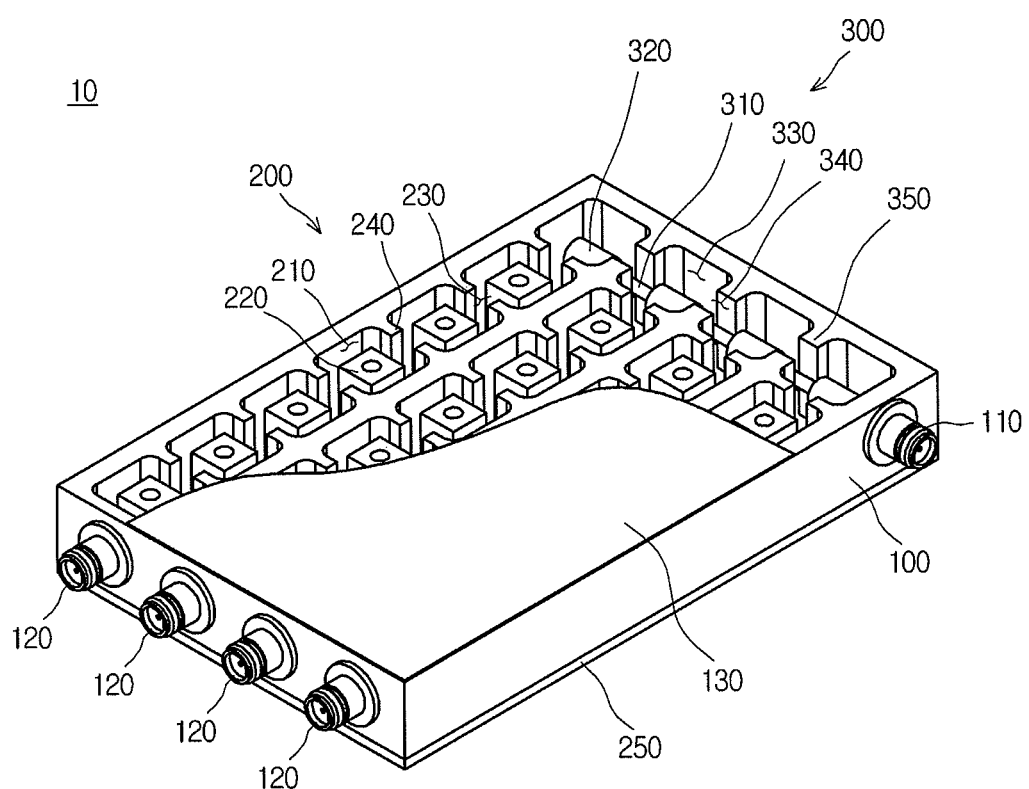
FIG. 1 is a diagram showing a multi-band filter according to an exemplary embodiment of the present invention.

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention. When it is determined that a detailed description of the known art related to the present invention may obscure the gist of the present invention, it will be omitted.

Terms 'first', 'second', and the like, may be used to describe various components, but the components are not to be construed as being limited by the terms. The terms are used only in order to distinguish one component from another component.

Terms used in the present specification are used only in order to describe specific exemplary embodiments rather than limiting the present invention. Singular forms are intended to include plural forms unless the context clearly indicates otherwise. It will be further understood that terms "comprises" or "have" used in the present specification specify the presence of stated features, steps, operations, components, parts, or a combination thereof, but do not
} preclude the presence or addition of one or more other features, numerals, steps, operations, components, parts, or a combination thereof.

Hereinafter, a multi-band filter according to an exemplary embodiment of the present invention will be described in detail with reference to the accompanying drawings. In describing a multi-band filter according to an exemplary embodiment of the present invention with reference to the accompanying drawings, components that are the same as or correspond to each other will be denoted by the same reference numerals, and an overlapped description thereof will be omitted.

FIG. 1 is a diagram showing a multi-band filter according to an exemplary embodiment of the present invention.

Figure 2:
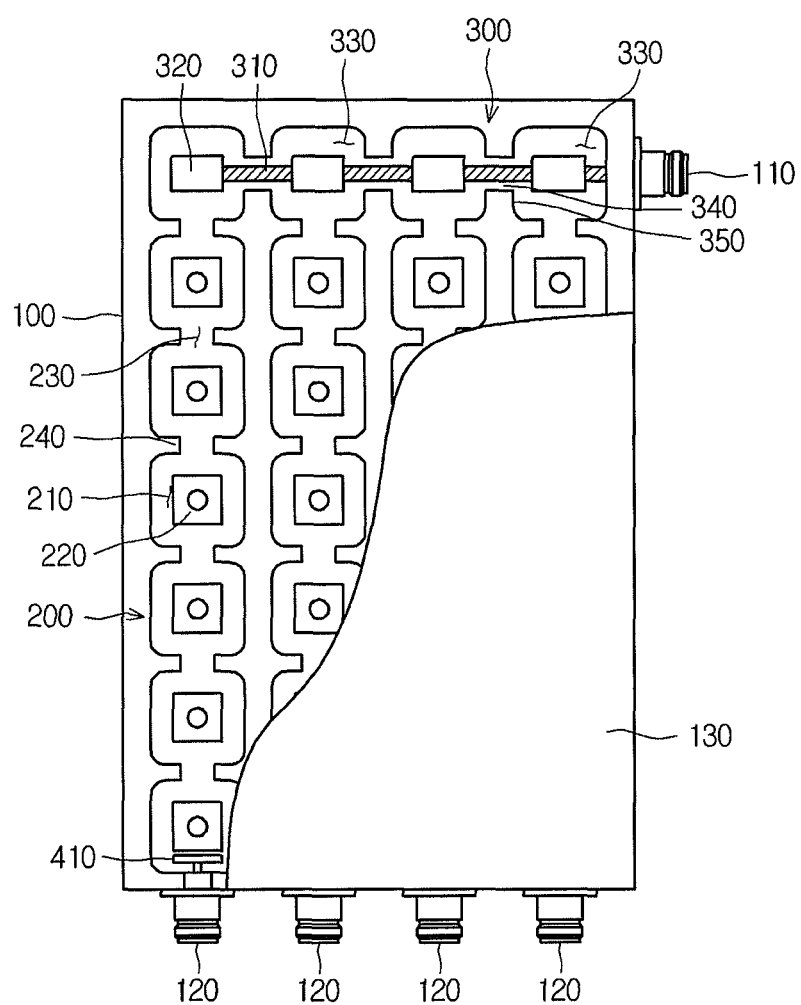
FIG. 2 is a diagram showing an internal structure of the multi-band filter according to an exemplary embodiment of the present invention.

FIG. 2 is a diagram showing an internal structure of the multi-band filter according to an exemplary embodiment of the present invention.

Referring to FIGS. 1 and 2, the multi-band filter 10 according to an exemplary embodiment of the present invention is configured to include a housing 100 including an antenna connector 110 and a plurality of input/output connectors 120, a band pass filter unit 200 provided in the housing 100 and including a plurality of resonators 220, and a coupling unit 300 having a plurality of feeding parts 320.

The housing 100 may include the antenna connector 110 connected to an antenna (not shown) so that bidirectional transmission and reception of wireless signals are possible and the plurality of input/output connectors 120 inputting/outputting the wireless signals in a specific frequency band transmitted and received through the antenna, in two directions.

The plurality of input/output connectors 120 may be connected to a signal processing circuit (not shown) processing the signals transmitted and received through the antenna. The signal processing circuit may process the signals transferred through the respective input/output connectors. 120 depending on a frequency band. For example, the signal processing circuit may include a radio frequency (RF) circuit.

The band pass filter unit 200 may pass signals in a preset specific frequency band among various frequency bands therethrough. In detail, the band pass filter unit 200 may be provided in the housing 100, as shown in FIGS. 1 and 2, and may selectively pass signals in the preset specific frequency band therethrough between the antenna connector 110 and the respective input/output connectors 120. In addition, a plurality of band pass filter units 200 may be provided in the housing 100 so as to connect the plurality of input/output connectors 120 and the coupling unit 300 to each other.

Each of the plurality of band pass filter units 200 may transmit the signal between the antenna connector 110 and the individual input/output connectors 120 to pass the signal in the preset frequency band therethrough. To this end, the band pass filter unit 200 may include a substrate 250 coupled to the housing 100 and serving as a ground and the resonators 220 coupled to the substrate 250 and installed in filtering cavities 210 formed in the housing 100.

The filtering cavity 210 will be first described before describing the resonator 220.

A plurality of filtering cavities 210 may be formed by perforating the housing 100 in a preset form.

The filtering cavities 210 may be partitioned in a shape of a groove receiving the resonators 220 therein, by a plurality of filtering partition walls 240. Here, a cross section of the filtering cavity 210 receiving the resonator 220 therein, taken in parallel with a horizontal surface may have a circular shape, an oval shape, or a polygonal shape. For example, the filtering cavity 210 receiving the resonator 220 therein may have a cylindrical shape or a rectangular pillar shape and may be lengthily formed from an upper surface of the housing 100 toward a lower surface thereof.

The plurality of filtering partition walls 240 may be provided with filtering windows 230 in order to form a signal transmission path between adjacent filtering cavities 210, that is, in order to open a partial region between the adjacent filtering cavities 210. In addition, the plurality of filtering partition walls 240 may partition the filtering cavities 210 at a predetermined size in order to adjust an amount of coupling between the resonators 220 received in the filtering cavities 210. Here, the filtering cavities 210 may be lengthily extended in one direction so that the filtering windows 230 are arranged in a row.

The housing 100 may have a rectangular shape as shown in FIGS. 1 and 2. However, the housing 100 is not limited to having the rectangular shape, but may have various shapes, if necessary. In addition, the housing 100 may be plated with a conductive material. For example, a wall surface of the filtering cavity 210 in the housing 100 may be plated with silver (Ag) or copper (Cu). In addition, the housing 100 may be coupled to the substrate 250 disposed therebelow to receive the resonators 220 in the filtering cavities 210.

In addition, the housing 100 may include a first coupling disk 410 connected to each of the plurality of input/output connectors 120 to transfer input/output signals to at least one of the input/output connectors 120 and the resonators 220. For example, the first coupling disk 410 may transfer a signal input from the input/output connector 120 to the resonator 220 or transfer a signal output from the resonator 220 to the input/output connector 120. The first coupling disk 410 may be disposed in the filtering cavity 210 of the housing 100 so as to be spaced apart from the input/output connector 120. Therefore, the first coupling disk 410 may induct input/output electromagnetic waves so as to pass only signals in a desired band.

The housing 100 may have a cover 130 coupled to an upper surface thereof so as to isolate an inner portion thereof from an outer portion thereof. Here, the cover 130 is coupled to the upper surface of the housing 100 to cover an opened surface of the housing 100. In addition, the cover 130 may be made of a material having a preset rigidity in order to protect the inner portion of the housing 100 from external impact. Further, the cover 130 may be made of a conductive material in order to reflect signals emitted from the inner portion of the housing 100.

The resonator 220 of the band pass filter unit 200 will be described in detail with reference to FIG. 3.

Figure 3:
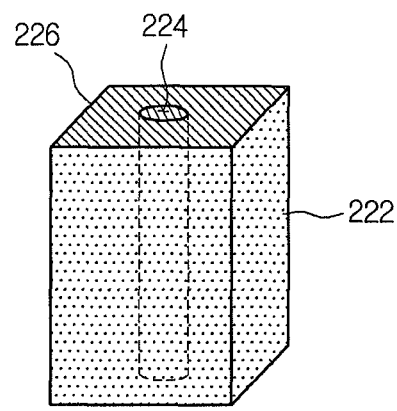
FIG. 3 is a diagram showing a structure of a resonator according to an exemplary embodiment of the present invention.

FIG. 3 is a diagram showing a structure of a resonator according to an exemplary embodiment of the present invention.

Referring to FIG. 3, the resonator 220 according to an exemplary embodiment of the present invention includes a body 222, a penetration hole 224, and a conductive film 226.

The body 222 may be made of at least one mixture or compound selected from a dielectric material group containing ceramic. In addition, a cross section of the body 222 taken in one direction may have one of a circular shape, an oval shape, and a polygonal shape. Further, the body 222 may be extended in a direction perpendicular to the taken cross section. For example, the body 222 may have a cylindrical shape, a cylindroid shape, or a rectangular parallelepiped shape. The body 222 may include the penetration hole 224 formed so as to penetrate therethrough.

The penetration hole 224 may be formed in a length direction of the body 222. Here, the penetration hole 224 may be formed so as to have a preset diameter. In addition, the penetration hole 224 may be formed so as to have a length corresponding to 214 of a resonance frequency. However, since the body 222 is made of high-k ceramic, a length of the penetration hole 224 may be changed.

The conductive film 226 may be coupled to at least one of both end surfaces of the body 222 in the length direction. In addition, the conductive film 226 may be coupled to a wall surface of the penetration hole 224. Here, the conductive film 226 may be made of a conductive material including a metal. In addition, the conductive film 226 may be formed by performing plating on the body 222.

The substrate 250 will be described in detail with reference to FIG. 4.

Figure 4:
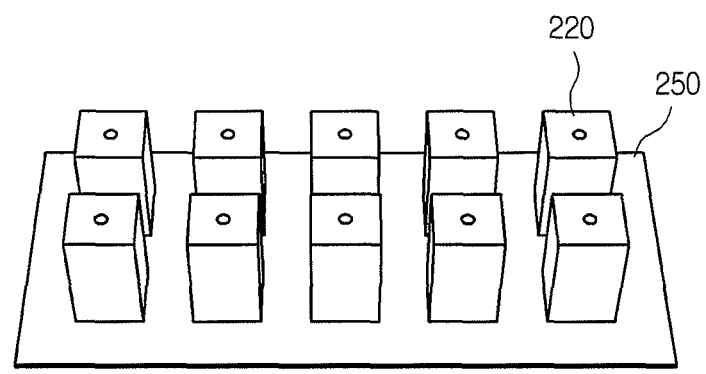
FIG. 4 is a diagram showing a structure in which the resonator is mounted on a substrate according to an exemplary embodiment of the present invention.

FIG. 4 is a diagram showing a structure in which the resonator is mounted on a substrate according to an exemplary embodiment of the present invention.

Further referring to FIG. 4, the substrate 250 may have at least one resonator 220 mounted on one surface thereof. Here, the resonator 220 may be mounted at a preset position on the substrate 250 so as to be received in the filtering cavity 210 of the housing 100. In addition, the substrate 250 may be electrically connected to the resonator 220. This substrate 250 may serve as a ground. For example, the substrate 250 may be a printed circuit board (PCB) including a conductive pattern (including an electrode) for the ground.

Here, the number of resonators 220 mounted on the substrate 250 may be variously set depending on a frequency band preset for filtering signals.

Again referring to FIG. 1, the coupling unit 300 is interposed between the antenna connector 110 and the plurality of band pass filter units 200 within the housing 100 to serve to couple the antenna connector 110 and the plurality of band pass filter units 200 to each other.

Here, the coupling unit 300 may include the plurality of feeding parts 320 so as to couple the antenna connector 110 and the plurality of band pass filter units 200 to each other in an open type scheme. The coupling unit 300 may be formed in a coupling structure in which it is connected to the antenna connector 110 to form a signal transmission path.

The coupling unit 300 may include a conductor bar 310 connected to the antenna connector 110, the plurality of feeding parts 320 disposed so as to be spaced apart from each other in a length direction of the conductor bar 310, and coupling cavities 330 formed in the housing 100 so that the conductor bar 310 traverses an inner portion of the housing 100.

Figure 5:
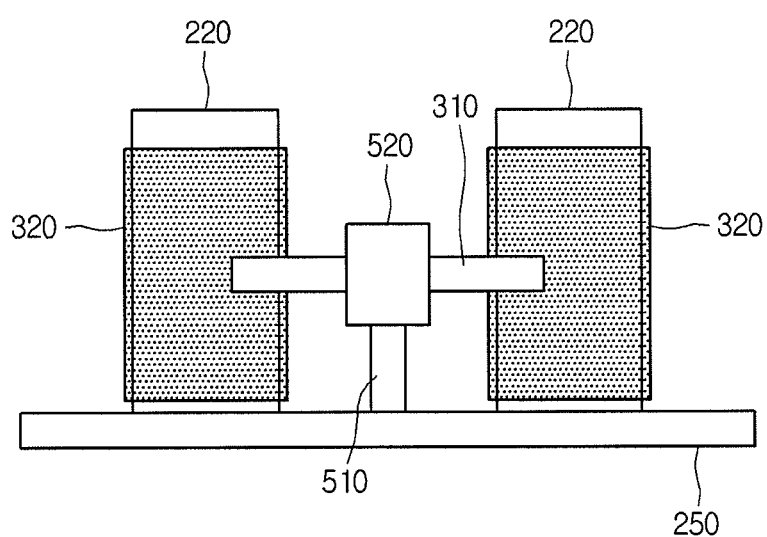
FIG. 5 is a diagram showing a structure of a coupling unit according to an exemplary embodiment of the present invention.

The conductor bar 310 may be extended in one direction so as to be connected to the antenna connector 110 and may be formed in a shape of a bar having a preset diameter. The conductor bar 310 may be formed of a conductive material. The conductor bar 310 may be fixed at a preset height by a fixture support 510 coupled onto the substrate 250 and a fixture 520, as shown in FIG. 5. Here, the fixture 520 may be made of a non-conductive material such as Teflon, or the like.

Each of the plurality of feeding parts 320 may transmit or receive signals in a preset frequency band to or from the band pass filter unit 200 corresponding to the preset frequency band, as shown in FIG. 5. To this end, each of the plurality of feeding parts 320 may be formed at a preset diameter and length in order to form an inductance and a capacitance corresponding to the preset frequency band.

Here, each of the plurality of feeding parts 320 may be extended outwardly from a central axis of the conductor bar 310 and may have a diameter larger than that of the conductor bar 310. In addition, each of the plurality of feeding parts 320 may be spaced apart from the resonator 220 of the band pass filter unit 200 that is the most adjacent thereto by a preset gap depending on a design condition. Further, the plurality of feeding parts 320 may be disposed so as to be spaced apart from each other by a preset gap so as not to have an influence on mutual frequency characteristics. A spaced distance between each of the plurality of feeding parts 320 and the resonator 220 that is the most adjacent thereto is adjusted, thereby making it possible to vary a coupling amount of the signals transferred by each of the plurality of feeding parts 320.

The coupling cavities 330 may be formed by perforating the housing 100 in order to receive the conductor bar 310 and the feeding parts 320 therein. In addition, the coupling cavities 330 may be extended in a direction in which they transverse the filtering cavities 210.

The coupling cavities 330 may be partitioned in a shape of a groove receiving the feeding parts 320 therein, by a plurality of coupling partition walls 350. Here, a cross section of the coupling cavity 330 receiving the feeding part 320 therein, taken in parallel with the horizontal surface may have a circular shape, an oval shape, or a polygonal shape. For example, the coupling cavity 330 receiving the feeding part 320 therein may have a cylindrical shape or a rectangular pillar shape and may be lengthily formed from the upper surface of the housing 100 toward the lower surface thereof.

Here, the coupling partition walls 350 may be provided with coupling windows 340 having a partially opened structure so that adjacent coupling cavities 330 are connected to each other.

In addition, the coupling window 340 may support the conductor bar 310 received in the coupling cavity 330. Here, the coupling window 340 may include a support member (not shown) installed in order to support the conductor bar 310.

The coupling unit 300 varies a diameter of the conductor bar 310, a length of the feeding part 320, a diameter of the feeding part 320, a spaced distance between the feeding parts 320, a size of an opened portion of the coupling window 340, and the like, thereby making it possible to vary a coupling amount of the signals transferred through the feeding parts 320. Therefore, the coupling unit 300 may vary a frequency bandwidth.

Further, in the coupling unit 300, the conductor bar 310 and the feeding part 320 may be formed in an integral type (module type). The conductor bar 310 and the feeding part 320 formed in the integral type may be easily received in the coupling cavity 330. The coupling unit 300 has durability more excellent than that of a short-type coupling structure using a soldering scheme, thereby making it possible to improve reliability of a product.

Figure 6:
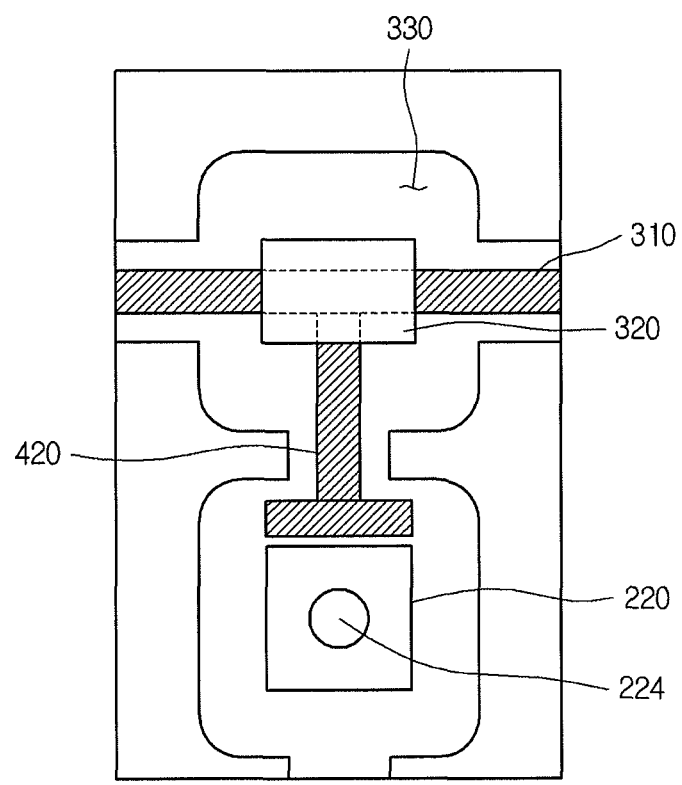
FIG. 6 is a diagram showing a structure of a coupling unit according to another exemplary embodiment of the present invention.

Meanwhile, the coupling unit 300 may include a second coupling disk 420 connected to the feeding part 320 to transfer input/output signals to at least one of the resonator 220 and the feeding part 320, as shown in FIG. 6. For example, the second coupling disk 420 may transfer a signal output from the resonator 220 to the feeding part 320 or transfer a signal input from the feeding part 320 to the resonator 220. The second coupling disk 420 may be disposed in the filtering cavity 210 so as to be spaced apart from the resonator 220.

With the multi-band filter according to an exemplary embodiment of the present invention, the resonators made of ceramic are used, thereby making it possible to improve attenuation characteristics and band rejection characteristics. In addition, with the multi-band filter according to an exemplary embodiment of the present invention, a single antenna port feeding structure is implemented, thereby making it possible to use a plurality of wireless communication services using a single antenna. Further, with the multi-band filter according to an exemplary embodiment of the present invention, the coupling structure is formed in a linear open type coupling structure that is simple and is easily installed, thereby making it possible to minimize an interference phenomenon of the band pass filter unit. Furthermore, with the multi-band filter according to an exemplary embodiment of the present invention, the linear open type coupling structure that is simple and is easily installed is used, thereby making it possible to simplify a manufacturing process at the time of mass-producing products and improve productivity of the products.

The spirit of the present invention has been illustratively described hereinabove. It will be appreciated by those skilled in the art that various modifications and alterations may be made without departing from the essential characteristics of the present invention.

Accordingly, the exemplary embodiments disclosed in the present invention are not to limit the present invention, but are to describe the spirit of the present invention. The scope of the present invention is not limited only to the exemplary embodiments.

The scope of the present invention should be interpreted by the following claims, and it should be interpreted that all spirits equivalent to the following claims fall within the scope of the present invention.

According to an exemplary embodiment of the present invention, the multi-band filter including the resonator having improved attenuation characteristics and band rejection characteristics may be provided.

What is claimed is:

1. A multi-band filter comprising:
   a housing including an antenna connector connected to an antenna and a plurality of input/output connectors inputting/outputting signals transmitted and received through the antenna depending on a preset frequency band;
   a plurality of band pass filter units provided in the housing and passing the signals in the preset frequency band therethrough between the antenna connector and the input/output connectors; and
   a coupling unit including a plurality of feeding parts so as to couple the antenna connector and each of the plurality of band pass filter units to each other,
   wherein each of the band pass filter units includes a resonator,
   wherein a spaced distance between each of the plurality of feeding parts and the resonator that is the most adjacent thereto is adjusted so as to vary a coupling amount of the signals transferred by each of the plurality of feeding parts.

2. The multi-band filter of claim 1, wherein the housing includes:
   a plurality of filtering partition walls partitioning filtering cavities disposed so as to correspond to the input/output connectors; and
   a plurality of coupling partition walls partitioning coupling cavities receiving the feeding parts therein.

3. The multi-band filter of claim 1, wherein the band pass filter unit includes a substrate coupled to a lower surface of the housing and serving as a ground, and the resonator being coupled to the substrate and including a conductive film coupled to at least one of end surfaces, in a length direction, of a body in which a penetration hole is formed in one direction and a wall surface of the penetration hole.

4. The multi-band filter of claim 3, wherein the body is made of a dielectric material and has the penetration hole formed therein in one direction.

5. The multi-band filter of claim 3, wherein the conductive film is coupled to at least one of both end surfaces of the body in the length direction and the wall surface of the penetration hole.

6. The multi-band filter of claim 3, wherein the housing includes a first coupling disk connected to the input/output connector to transfer input/output signals to at least one of the input/output connector and the resonator and disposed so as to be spaced apart from the resonator by a preset gap.

7. The multi-band filter of claim 3, wherein the coupling unit includes a second coupling disk connected to the feeding part to transfer input/output signals to at least one of the feeding part and the resonator and disposed so as to be spaced apart from the resonator by a preset gap.

8. The multi-band filter of claim 1, wherein the coupling unit includes a conductor bar connecting the feeding parts to each other and connected to the antenna connector.

9. The multi-band filter of claim 1, further comprising a cover coupled to the housing and covering an opened surface of the housing.

10. The multi-band filter of claim 1, wherein each of the plurality of feeding parts is formed at a preset diameter and length so as to form an inductance and a capacitance corresponding to the preset frequency band.

* * * * *